UNITED STATES PATENT OFFICE.

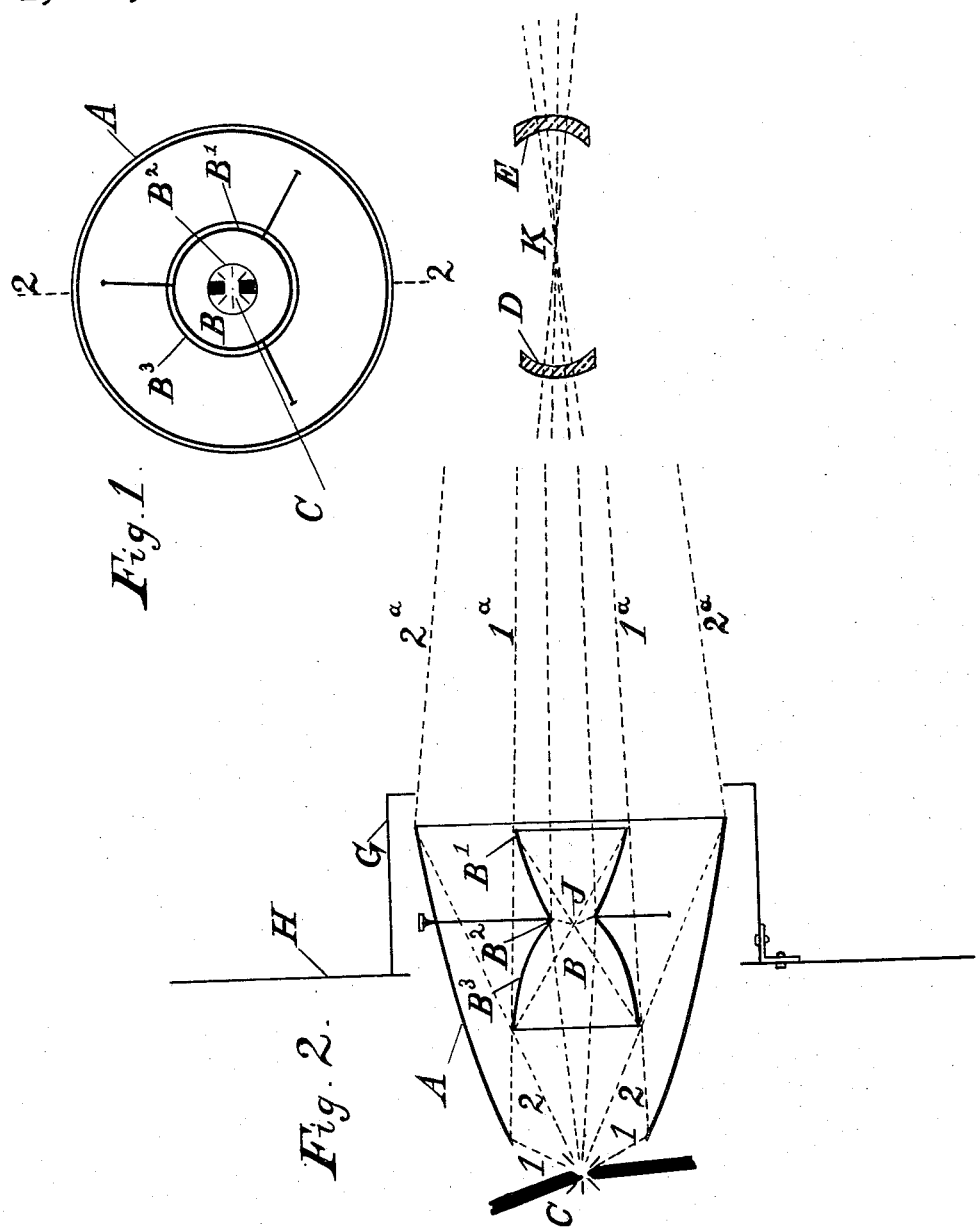

CHARLES BARRY BOYLE, DECEASED, BY ELVA J. BOYLE AND ZOLA M. BOYLE, ADMINISTRATRICES, OF NEW YORK, N. Y., ASSIGNORS, BY MESNE ASSIGNMENTS, TO BOYLITE CONCENTRATOR, INCORPORATED, A CORPORATION OF NEW YORK.

PROJECTION INSTRUMENT.

1,085,795.  Specification of Letters Patent.  Patented Feb. 3, 1914.

Application filed October 11, 1912. Serial No. 725,156.

*To all whom it may concern:*

Be it known that CHARLES BARRY BOYLE, now deceased, of whom the undersigned, ELVA J. BOYLE and ZOLA M. BOYLE, who reside in the borough of Manhattan, city, county, and State of New York, are the duly appointed administratrices, invented a certain new and useful Improvement in Projection Instruments, of which the following is a specification.

The object of the invention is to provide a suitable substitute for the ordinary condenser, which, being of glass and located close to the source of light, is liable to be affected by the extreme heat, sometimes even being cracked or shattered.

This invention is adapted to concentrate light emanating from a suitable source and bring it to a focus substantially as would be done by the ordinary condenser.

One form of the improvement is hereinafter described, and is illustrated in the accompanying drawings forming a part of this specification, in which—

Figure 1 is a front view of the instrument and Fig. 2 a vertical section on the line 2—2 of Fig. 1, and is intended to represent the instrument in position in the condenser cell of a kinematograph or other projection instrument.

Referring to the drawings, A represents an ellipsoidal reflector of suitable diameter and length and preferably open at the small end so that the light C may be placed at the focus. The reflecting surface of A is concentric with the major axis of the generating ellipse, the foci, of which may be spaced apart as required for any particular instrument so that the source of light C will be at one focus while the converging rays of reflected light will be concentrated at a focus located at the optical center of the objective. It is impractical to have the large ellipsoidal reflector A very long, hence as indicated in Fig. 2 it is usually only a fractional part of the length of the major axis of the generating ellipse. This length in the present instance is adapted to receive and reflect all rays of light between the cones indicated by the dotted lines 1 and 2 of Fig. 2, which are reflected toward the other focus along the lines 1ª and 2ª. This length, however, is not sufficient to intercept the cone of divergent rays between the lines 2, which, it will be seen, would pass beyond the forward end of the reflector A. In the form of the invention here shown the divergent rays between the lines 2 which, as stated, would escape the reflector A are preferably collected and caused to converge at the same point by another member comprising a double ellipsoidal reflector B of "hour-glass" shape located within and concentrically of the axis of the reflector A. The posterior section B³ of the reflector B flares out toward the source of light and is a portion of such an ellipsoid as would be generated by an ellipse having one focus at the source of light C and the other at the point J. The flaring end of the reflector B³, as will be seen from Fig. 2, is so located as to receive all the diverging rays of light in the cone between the dotted lines 2 and reflect them to and through the focus J. The small end of the reflector B³ is preferably removed as shown at B² in a plane passing through the focus J and is united in this plane with the smaller end of the forwardly flaring ellipsoidal reflector B¹. The ellipsoidal reflector B¹ has its end removed along the plane B² which, as with B³, passes through its focus thus making the point J the focus of both reflectors B¹ and B³: hence all rays of light reflected from B³ after passing through the focus J will be received and reflected from the surface of B¹ and caused to converge toward the other focus of the ellipsoid, which in the present instance coincides with the focus K.

The double ellipsoidal reflector member B is arranged in the mouth of the large reflector A concentrically with the axis thereof and may protrude therefrom if convenient or desirable, the arrangement being such that the combined focal lengths of the generating ellipses of the reflectors B¹ and B³ shall equal the focal length of the generating ellipse of the reflector A. In other words the rays of light gathered from the diverging cone between the dotted lines 2 by the reflector B³ will be brought to the optical center K of the objective along with the converging rays between the lines 1ª and 2ª coming from the reflector A, as previously explained. Thus practically all the light emanating from the source of light C and diverging therefrom within the cone determined by the circular small end of the reflector A (indicated by the dotted lines 1) will be reflected by the compound condensing reflector comprising the ellipsoidal reflectors A, B³ and B¹ and brought to the same focus K, which in the present instance is the optical center of the objective or projecting lenses D and E. It will thus be seen that the invention may be substituted for the usual condenser lens in projecting lanterns or the like, the front board of such an instrument being indicated at H in Fig. 2 and the condenser tube or cell at G.

The ellipsoidal reflector A and the members of the double ellipsoidal reflector B may be calculated either conjointly or separately for any desired focus; the focus of the respective reflectors being determined by the size of the instrument and the relative position of the light and the projection lens. In adapting or substituting this invention for the ordinary condensing lens, the requirements are the same, that is, for any particular instrument the cone of divergent rays from the source of light must be collected by the condenser and caused to converge toward a focus located at the optical center of the projection lens.

The invention is not limited to the particular form or arrangement shown for it and it will be readily understood that various modifications may be made in adapting the device to various instruments without departing from the spirit and scope of the claims.

What is claimed is:

1. A compound condensing reflector comprising a plurality of concentrically arranged ellipsoidal reflectors adapted to change divergent rays from a source of light to rays convergent to a common focus, the inner ellipsoidal reflectors being of such focal length that the combined focal length of two of them placed end to end shall equal the focal length of the outermost reflector.

2. A condensing reflector comprising two frustums of ellipsoidal reflectors, cut off in planes parallel to the revolving axis and placed in axial alinement with the small ends of said frustums united so that adjacent foci are coincident, the arrangement being such that divergent rays of light from the outer focus of one frustum will be condensed at the outer focus of the other frustum.

3. A compound condensing reflector comprising an outer ellipsoidal reflector of given focal length, and a pair of ellipsoidal reflectors placed end to end and axially within said outer reflector, the combined focal length of the end to end inner reflectors being equal to the given focal length of the outer reflector, whereby divergent rays of light emanating from one focus of the compound reflector will be intercepted and reflected conjointly by the several reflectors and caused to converge toward the other focus thereof.

4. The combination of a source of light, a projection lens, an ellipsoidal reflector, two smaller ellipsoidal reflectors which are cut away in a plane perpendicular to their major axes, approximately at their foci and placed back to back and which are located within the larger reflector in such a position as to intercept divergent rays and direct them outwardly in convergent beams, the larger ellipsoidal reflector and the two smaller ellipsoidal reflectors being so constructed and arranged that the focus of the cone of rays sent forward conjointly by both members of the reflecting system shall lie at substantially the focus of the lens system.

5. The combination of a source of light, a projection lens, and a compound ellipsoidal reflector the ellipsoidal members of which are so calculated and arranged that divergent rays from the source of light reflected therefrom will converge to a common focus at the optical center of said projection lens.

6. The combination of a source of light, a projection lens and a condensing reflector comprising an outer ellipsoidal reflector and two smaller ellipsoidal reflectors which are cut away in a plane perpendicular to their major axes, approximately at their foci and placed back to back, the two reflectors being located axially within said outer member in such position as to receive and reflect divergent rays which would otherwise escape beyond the forward end of said outer reflector, the several ellipsoidal members being so constructed and arranged that the cone of convergent rays sent forward by the reflector as a whole will be brought to a focus at substantially the optical center of the projection lens.

7. The combination of a source of light, a projection lens and a reflector-condenser comprising an outer ellipsoidal reflector having a focal length equal to the distance between the source of light and the optical center of said lens, and two smaller ellipsoidal reflectors placed end to end and axially within said outer reflector, the combined focal length of the end to end small reflectors being equal to the focal length of said outer member, the arrangement being such that divergent rays from the source of light, intercepted by said ellipsoidal reflectors, will be brought to a common focus at the optical center of said lens.

8. The combination of a source of light, a projection lens and a reflector-condenser comprising an outer ellipsoidal reflector and two smaller ellipsoidal reflectors placed end to end with their foci coinciding, and so located axially within said outer reflector that the flaring end of one reflector will be toward the source of light and at such a distance therefrom as to intercept the cone of rays which would otherwise escape reflection from said outer reflector, the arrangement being such that the intercepted divergent rays are reflected from the several ellipsoidal reflectors and ultimately brought to a common focus at the optical center of said lens.

9. The combination of a source of light, a projection lens and a pair of ellipsoidal reflectors placed in axial alinement with adjacent foci coincident, the other foci being at the source of light and at the optical center of said lens respectively.

10. The combination of a source of light, a projection lens and a pair of ellipsoidal reflectors which are cut away in a plane perpendicular to their major axes, approximately at their foci and placed back to back, one reflector having its outer focus at the source of light and adapted to receive divergent rays therefrom and the other reflector having its outer focus at the optical center of said lens thereby being adapted to reflect light received from the first reflector and converge it toward the focus at said optical center.

11. The combination of a source of light, a projection lens and a reflector condenser comprising an ellipsoidal reflector interposed between said source of light and said projection lens and having a focal length equal to the distance between the source of light and the optical center of said lens whereby all divergent rays emanating from said source of light and striking said reflector are concentrated at the optical center of said lens.

Signed at the city of New York, in the county and State of New York, this 4th day of October, 1912.

ELVA J. BOYLE,
ZOLA M. BOYLE,
Administratrices of Charles Barry Boyle, deceased.

Witnesses:
A. C. McDonnell,
S. J. Cox.